3,649,665
HYDROCARBON OXIDATION WITH NITRIC
OXIDE AND OXYGEN
Harry Chafetz, Poughkeepsie, N.Y., William D. Blackley,
Lake Elmo, Minn., and Kenneth L. Kreuz, Fishkill,
N.Y., assignors to Texaco Inc., New York, N.Y.
No Drawing. Filed Apr. 23, 1969, Ser. No. 818,837
Int. Cl. C07c 77/00, 77/02, 79/02
U.S. Cl. 260—466               15 Claims

ABSTRACT OF THE DISCLOSURE

This invention relates to the relatively low temperature treatment of hydrocarbons with nitric oxide (NO) and oxygen to produce nitrates, nitrites and ketones and other oxidation products. Through the use of alkaline inhibitors such as the alkali metal bicarbonates, the production of ketones and other non-nitrogen containing oxidation products can be minimized while the production of nitrates and nitrites are maximized.

---

This invention relates to a novel nitrooxidation process to prepare nitrogen containing and non-nitrogen containing oxidation products.

More particularly this invention concerns the low temperature treatment of hydrocarbon substrates with oxygen and nitric oxide under reaction conditions which can control the nature of the oxidation products.

Saturated hydrocarbons such as the straight chain and cycloalkanes are widely distributed in crude oils and for this reason are attractive, low cost substrates for further transformation. Unfortunately, the saturates are relatively recalcitrant to most chemical reactions except at considerably elevated temperatures.

Recently, the applicants have discovered that the saturated hydrocarbons among other hydrocarbons undergo nitrooxidation under comparatively mild reaction conditions when treated with nitric oxide and oxygen. Not only does the reaction proceed effectively under 200° C., but atmospheric pressures can be employed and little or no excessive oxidation takes place. In addition, the inventive process lends itself to either batch or continuous operation and does not require special process equipment. Further, the incorporation of certain alkaline inhibitors into the reaction mixture permits the optimization of nitrate and nitrite products at the expense of non-nitrogen containing oxidates such as ketones.

It is, therefore, an object of this invention among others to provide a novel low temperature process for the nitrooxidation of hydrocarbon substrates at atmospheric pressures.

It is another more specific object of this invention to utilize the above described process for the preparation of hydrocarbon derivatives such as nitrates, nitrites, carboxylic acids and ketones.

Yet another specific object of this invention is to provide a nitrooxidation process wherein the type of products obtained can be selectively controlled through the use of alkaline inhibitors.

Additional objects will suggest themselves to those skilled in the art after a perusal of this application.

In practice, the above objects are achieved by treating the hydrocarbon substrate to be nitrooxidized with nitric oxide and oxygen at temperatures ranging between about 0° C. and 200° C. until nitrooxidation products are formed and isolating the nitrooxidation products obtained therein.

In the favored practice, hydrocarbon substrates containing at least three carbon atoms are treated with gaseous oxygen and nitric oxide, the oxygen being in volume excess, at flow rates totaling from about one to 25 volumes of gas per minute per volume of hydrocarbon charge at temperatures ranging from about 25° C. to about 150° C. until nitrooxidation product containing carbon-oxygen and carbon-nitrogen bonds are formed. These products which are predominantly nitrates, nitrites, carboxylic acids and ketones are concentrated and isolated using the usual methods employed in the the isolation of esters and ketones in preparative chemistry.

In the preferred aspect of the inventive process, hydrocarbon substrates containing from about 5 to 30 carbon atoms are admixed with at least one alkaline inhibitor and then treated with volume ratios of gaseous oxygen to nitric oxide varying from about 5 to about 30 at flow rates totaling from about 2.5 to about 5 volumes of gas per minute per volume of hydrocarbon substrates at temperatures ranging from about 25° C. to about 100° C., until nitrogen containing oxidation products are produced to the substantial exclusion of non-nitrogen containing oxidation products. Again the reaction mixture is worked up by separation and concentration techniques described in the literature.

In order to aid in the understanding the inventive concept, the following supplementary disclosure is submitted.

(A) HYDROCARBON SUBSTRATES

The hydrocarbon substrates which can be used as starting materials in the nitrooxidation process comprise the saturated straight chain aliphatics, the cycloaliphatics, the aromatics, the alkylated aromatics and the olefins (or alkenes). The most preferred substrates for reasons for availability and ease of nitrooxidation are those alkylated aromatic hydrocarbons containing 7 to 30 carbon atoms.

Illustrative substrates include the pentanes, hexanes, cyclohexane, heptanes, octanes, nonanes, decanes, undecenes, dodecanes, cetane and their higher homologues, the pentenes, hexenes, ketenes, octenes, nonenes, decenes, undecenes, dodecenes and their higher homologues, benzene and its alkyl homologues, toluene, xylenes, mesitylene, ethyl benzene, propylbenzene, cumene, isocumene, durene, isodurene, and the like.

(B) REACTION CONDITIONS

Concentration and ratio of reactants, temperatures, etc.

(1) Ratio of reactants.—At present, due to the complexity of the reaction, the exact stoichiometry of the reaction is unknown. However, based upon considerable experimentation, it is possible to disclose workable and preferred parameters in terms of volumes of the gaseous reactants that are contacted per unit time with the substrate, and the ratio of the oxygen gas to the nitric oxide gas.

The reaction can be run in the presence of an inert gaseous diluent such as nitrogen, neon, argon and the like. When air is used as the source of oxygen the natural diluent present is the approximately 75% by volume nitrogen, present in air. The only apparent difference in using oxygen instead of air is the acceleration of the reaction rate at a given temperature and the consequent reduction of reaction time. The nitrooxidation reaction can be run either by contacting the hydrocarbon with the separate gases or alternatively by contacting the substrate with a preformed mixture containing free nitric oxide and oxygen (or air) in a constant volume ratio. In both cases the same products are obtained. However, using separate gases more readily permits variable ratios of the two gaseous components to be contacted with the substrate by increasing the flow rate of one gas while holding the flow rate of the other gas constant or decreasing it. Whatever system is used the following parameters hold.

(1) Ratio of oxygen to nitric oxide.—Whether air or oxygen is employed as the source of oxygen it should be used in volume excess compared to the nitric oxide. Volume ratios of oxygen ranging from 1 to 40 for each volume of NO used have been employed. Lower volume ratios give little or no reaction over the temperatures of 0 to 200° C. and are therefore unsatisfactory. Higher ratios are generally more costly and at the upper end of the temperature range used caused excessive formation of highly oxidized products. For most purposes at the preferred reaction tmperature range of from about 25 to 100° C. and where the olefins or alkylated aromatics are the substrates, molar volume ratios of 5 to 30 volumes of oxygen for each volume of nitric oxide give good results and are hence preferred.

(2) Flow rate of gases per unit volume of substrate.—Again higher flow rates may accelerate the rate of reaction at a given temperature since they may increase the quantity of oxygen brought into contact with the substrate. However, higher flow rates are more costly and therefore their general use is not advocated. Flow rates of gases be tween about 1 to 25 volumes per minute per volume of substrate have been successfully employed while the best results have been obtained with flow rates per unit time from about 2.5 to 5 volumes per minute per volume of substrate. The flow rate of gases used ordinarily depend upon the quantity of hydrocarbon substrate, the size of the reactor and the rate of mixing of liquid and gas phases.

(3) Reaction temperatures and reaction times.—As indicated previously, good results have been obtained with reaction temperatures ranging between about 0° and 200° C. Lower temperatures give little or no reactions particularly with the more sluggishly reactive saturated aliphatics while higher temperature give rise to overly oxidized carbonaceous products particularly when the more reactive olefins are used as substrates. A reasonable balance between reaction rate and quality of product can usually be obtained at temperatures ranging between about 25° C. and 100° C. and for these reasons, this represents the preferred operating temperature range.

The reaction timeis a variable dependent upon th reactivity of the particular substrate employed, the volume ratio of oxygen to nitric oxide, the flow rate, the mixing rate, and the reaction temperature. Ordinarily, the reaction takes at least 2 or 3 hours after initiation to form significant quantities of nitrooxidation products from paraffins in batch operations and can require as long as several days when the more recalcitrant paraffins are the substrates.

(4) Presence of alkaline inhibitor.—The inventive nitrooxidation reaction can be run in the absence or in the presence of alkaline inhibitor. The presence of an inhibitor does not apparent affect the reaction rate or the temperature at which the reaction can be run. However, the presence of inhibitor assures the selective production of maximum quantities of nitrogen and oxygen containing substrates such as nitrates and nitrites while minimizing the production of non-nitrogen containing oxidation products such as aldehydes, ketones and carboxylic acids.

The advantage in the use of inhibitor is that in some instances it permits running the reaction at the upper temperature ranges without producing the sometimes less desirable non-nitrogen containing oxidation products. Inasmuch as the nitrogen containing oxidation products such as nitrates and nitriles are valuable intermediates when used for making alcohols, the use of the alkaline inhibitor under the above described reaction conditions represents the preferred process embodiment of this invention.

The inhibitors are generally alkaline, inorganic salts or bases, that are insoluble or poorly soluble in the hydrocarbon substrate, and which will not hydroyze the products under reaction conditions. Illustrative alkaline inhibitors include bicarbonotes such as sodium, potassium and lithium; carbonates such as sodium, potassium and lithium; hydroxides such as calcium, barium and strontium, and fluorides such as sodium, potassium and lithium.

In order to describe the workings of the inventive process in the greatest possible detail, the following illustrative examples are submitted.

The first group of examples, 1 to 7, are nitrooxidations run in the absence of inhibitor, while the second group of examples, 8 and 9, are run in the presence and absence of inhibitor.

EXAMPLE 1

Nitrooxidation of cyclohexane with separate gaseous oxygen and nitric oxide

A 252 gram portion of cyclohexane is charged into a conveniently sized reactor equipped with thermometer, and stirrer and connected to two flow meters connected with sources of nitric oxide and oxygen. Oxygen at a flow rate of 250 ml./minute and NO at a flow rate of 25 ml./minute are passed into the stirred cyclohexane substrate heated to 30–32° C. for a period of 23.5 hours. At the end of this time the unreacted cyclohexane is stripped off and the remaining material is washed with water, dried and fractioned under reduced pressure. The distilled fractions are investigated by means of their infrared spectra and contain a mixture of cyclohexyl nitrate (main product), cyclohexyl nitrite, nitrocyclohexane and cyclohexanone.

The same reaction is repeated on a 156 gram portion of cyclohexane kept at 23–25° C., by passing separate streams of oxygen (500 ml./minute) and NO (23 ml./minute of a 23/27-NO/$N_2$ mixture) into the hydrocarbon for 4 hours. After stripping off cyclohexane, infrared spectra of the residue show that cyclohexyl nitrate and nitrite are present.

The same reaction is repeated at 25–26° C. by passing 250 ml. per minute of oxygen and 30 ml. of NO per minute into the cyclohexane. Again cyclohexyl nitrate and nitrite are prepared.

In another run, oxygen (250 ml./minute) and NO (30 ml./minute) are passed into 380 gram portion of cyclohexane at 50–52° C. for 3 hours. After stripping and separating as before cyclohexane, cyclohexane nitrate and nitrite are present according to infrared analysis.

EXAMPLE 2

Nitrooxidation of methylcyclohexane using nitric oxide and oxygen separately

Using the same procedure described in Example 1 oxygen (250 ml./minute) and nitric oxide (25 ml./minute) are passed into 165 ml. of methylcyclohexane kept stirred at 25° C. for 6 hours. At the end of this time as indicated by infrared, significant methylcyclohexyl nitrate and nitrite are present. The unreacted methylcyclohexane is stripped off leaving a residue which upon infrared spectral analysis is confirmed to contain the methylcyclohexyl nitrite and nitrate.

EXAMPLE 3

Nitrooxidation of cumene with separate oxygen and nitric oxide reactants

In this example oxygen (at 250 ml./minute) and nitric oxide (at 25 ml./minute) are separately passed into a stirred 240 gram (2 mole) portion of cumene kept at 25–30° C., for a period of 24 hours. Examination of samples of the reaction mixture during and after the 24 hour reaction time by infrared spectroscopy show the presence of α-cumyl nitrate and nitrite. At the end of this time the reaction is terminated and the reaction mixture stirred with 200 ml. of a 5% by weight sodium hydroxide solution for 3 hours while cooling in an ice bath. A dark redbrown aqueous phase separates and is acidified with dilute hydrochloric acid and extracted with diethyl ether. The extracts are examined by infrared and nuclear magnetic resonance spectra and contain benzoic acid and 2,4-dinitrophenol among other phenols.

The cumene layer is dried and fractionated under reduced pressure into 10 cuts. Infrared spectroscopic inspection shows that fractions 1, 2, 3 and 4 contain acetophenone and infrared and gas chromatography analyses of fractions 6–10 established the presence of ortho-, meta- and para-nitrocumene.

EXAMPLE 4

Nitrooxidation of toluene using nitric oxide and oxygen separately

The same procedure used in the preceding examples is used except that in this run toluene is used as substrate.

Oxygen (250 ml./minute) and nitric oxide (25 ml./minute) are passed separately into a 188 gram portion of stirred toluene kept at 25–30° C. for 24 hours. At the end of this time the crude reaction mixture, a light red-brown liquid, is stirred for 2 hours with 200 ml. 5% by weight aqueous solution of sodium hydroxide. The aqueous layer is separated, acidified with dilute hydrochloric acid and extracted with ethyl ether. Evaporation of the ether leaves a residue which infrared and elemental analyses determine to be mainly benzoic acid and α-nitrotoluene. The organic layer when washed, dried and stripped of unreacted toluene and fractionated leaves an organic residue. This residue is separated by gas chromatography and is demonstrated by infrared analysis to contain substantial quantities of benzaldehyde, benzyl nitrate and ortho-and para-nitrotoluenes.

EXAMPLE 5

Nitrooxidation of p-xylene using separate gaseous oxygen and nitric oxide

Oxygen, at a rate of 250 ml./minute and nitric oxide, at a rate of 15 ml./minute are passed into a 212 gram stirred portion of p-xylene kept at 80° C., for a period of 24 hours. The same type of reactor used in Example 1 is employed. The water that forms is separated and the crude reaction mixture is kept at 0° C. for an additional 24 hours. Toluic acid, as shown by melting point and elemental analysis crystallizes out and is removed leaving a filtrate. The filtrate is first extracted with sodium bicarbonate solution then with sodium hydroxide solution. The organic layer is distilled under reduced pressure to produce a mixture which infrared analysis demonstrates to contain tolyl nitrate, nitrotoluene and tolualdehyde.

EXAMPLE 6

Nitrooxidation of ethylbenzene using separate streams of gaseous oxygen and nitric oxide Using the procedure tnd reactor described in Example 1, oxygen (250 ml./minute) and nitric oxide are separately passed into a stirred 212 gram portion of ethylbenzene heated to 25° C. After 24 hours the reaction is terminated and the water separated. The crude reaction mixture is stirred for 2 hours with 120 ml. of a 10% by weight aqueous sodium hydroxide solution and turns red-brown. The red-brown aqueous phase is acidified with hydrochloric acid and extracted with ether to yield a dark brown semi-solid which infrared analysis indicates is mainly benzoic acid. The organic phase is stripped of unreacted ethylbenzene and fractionated under vacuum through a glass column packed with glass helices. The fractionated portion is shown to contain acetophenone and ortho- and para-nitrobenzenes.

EXAMPLE 7

Nitrooxidation of n-dodecane with gaseous oxygen and nitric oxide

Using the procedure described in the earlier examples separate streams of oxygen (400 ml./minute) and nitric oxide (32 ml./minute) are passed into a 170 gram portion of n-dodecane heated at 150° C. for a period of 5 hours. The reaction is exothermic and in spite of occasional cooling, some carbonization deposit is formed. The crude reaction mixture is extracted with a 10% by weight aqueous sodium hydroxide solution and the basic extracts are acidified and extracted with diethyl ether. The ether extracts upon evaporation and separation by gas chromatography are found to contain aliphatic ketones, nitrates and nitroaliphatics.

EXAMPLE 8

Nitrooxidation of cetane using mixtures of nitric oxide and air (A) Without alkaline inhibitor.—To a conveniently sized reactor fitted with thermometer, heating and stirring means and a flow meter hooked up with a mixing chamber in which desired volume ratios of nitric oxide in air are prepared, is charged 250 ml. of cetane substrate. Into the stirred substrate kept at 125° C. is passed a mixture of NO and air, preformed in the mixing chamber to contain 5.08 vol. percent NO in air. The NO-air mixture is passed into the substrate for 5 hours at a flow rate of 600 ml./minute. At the end of this time the monitoring infrared indicates considerable oxidation as manifested by carbonyl group formation with little or no nitrate or nitrite formation. The water formed is separated and unreacted cetane is stripped off under vacuum. After working up the reaction mixture as described in Example 1, infrared analysis confirms that predominantly carbonyl group containing products are present. Little or no nitrate or nitrite product is present.

(B) With alkaline inhibitor.—Using the same type of reactor, the same volume of cetane heated to the same temperature, and the same mixture of NO and air at the 600 ml./per minute flow rate described in A, the experiment of A is repeated except that the hydrocarbon substrate continued 10 grams of dispersed NaHCO$_3$ inhibitor. After 4 hours, infrared monitoring indicated that considerable aliphatic nitrate and nitrite formation has taken place and the reaction is terminated. After working up the water-separated reaction mixture as in A, a residuum is obtained comprising mainly aliphatic nitrates and nitrites, probably cetyl nitrates and cetyl nitrite with little or no carbonyl group containing material present. This embodiment indicates that the presence of alkaline indicator can control the nature of the products obtained in that non-nitrogen containing oxidation products are minimized to the benefit of nitrogen containing oxidation products.

EXAMPLE 9

Nitrooxidation of cetane using mixtures of nitric oxide and air (A) Without alkaline inhibitor.—To a conveniently sized reactor fitted with heating and stirring means and connected to a flow meter hooked up to a mixing chamber in which the desired volume ratios of air and nitric oxide are prepared, is charged 150 parts by volume of cetane. Into the stirred substrate, kept at 150° C., is passed a NO-air mixture (0.20 vol. percent NO–0.80 vol. percent air) for two hours at a rate of 585 ml./minute. At the end of this time the reaction is terminated. After separating the water formed during the reaction, the reaction mixture is worked up as in Example 7 and analyzed by infared analysis. Considerable oxidation to non-nitrogenous oxidation products, such as alkanes containing carbonyl groups, is observed. Considerably less quantities of nitrates or nitrites are present although the water formed contained aqueous nitric acid.

Similar results are obtained at temperatures of 100° C. in which the same mixture of nitric oxide and air are passed through at a lower flow rate, 570 ml. of gas per minute.

Flow rates of the same gas-air mixture at 565 ml. per minute at a reaction temperature of 75° C., and 600 ml./minute at 100° C., both over a period of 7 hours produced no reaction whatsoever.

(B) With alkaline inhibitor.—To the reactor used in Part A, is charged 150 ml. parts by volume of cetane containing 10 parts by weight of dispersed NaHCO₃. Into the stirred mixture heated to 150° C. is passed a premixed NO-air mixture comprising 0.20 vol. percent NO–0.80 vol. percent air, for a period of 2 hours, at a flow rate of 585 ml. per minute. At the end of this time, the reaction is terminated, the water is separated, the reaction mixture worked up as in Example 7, and analyzed by infrared analysis. Considerable quantities of aliphatic nitrates and aliphatic nitrites are present, and in contrast to the results in Part A, little or no non-nitrogen containing oxidation products are present.

Similar results are obtained at 100° C. using $Na_2CO_3$ (5 grams), at 150° C., using $NaHCO_3$ (3 grams) and at 100° C. using NaF (15 grams), using the same quantities of cetane substrate, the same 0.20 volume percent–0.80 vol. percent NO-air mixtures and the same 585 ml. per minute flow rate. Again the effect of alkaline inhibitor in controlling product distribution is clearly shown.

As the preceding specification has demonstrated that the inventive process offers several significant advantages compared to the prior art. For example, the invention process proceeds smoothly under 200° C., whereas comparable types of reactions require temperatures considerably in excess of these temperatures. Another advantage of the inventive process and one which is wholly unexpected was the discovery that the incorporation of alkaline inhibitor into the reaction mixture maximizes yields of nitrogen-containing oxidation products such as the nitrates and nitrites, and minimizes the yields of non-nitrogen containing oxidation products such as the ketones.

Finally, the inventive process is advantageous in that numerous changes may be made in reaction conditions and the like without departing from the inventive concept. For example, flexability exists in the choice of substrate, ratio of nitric oxide to oxygen, temperatures, etc. The metes and bounds of this invention may best be determined by the claims which follow read in conjunction with the specification.

What is claimed is:

1. A process for preparing nitrooxidation products of hydrocarbon substrates selected from the group consisting of saturated straight chain aliphatics, saturated cycloaliphatics, aromatics, and alkylated aromatics, said saturated linear and cycloaliphatics containing at least 3 carbon atoms, comprising the steps of:
    (a) treating said hydrocarbon substrate to be nitrooxidized with oxygen and nitric oxide at temperatures ranging from about 25° C. to about 150° C., said oxygen being present in molar excess to said nitric oxide, until nitrooxidation products are formed, and
    (b) isolating the nitrooxidation products contained therein.

2. The process of claim 1 wherein the hydrocarbon substrates are selected from the group consisting of alkanes, aromatics and alkylated aromatics containing at least three carbon atoms in the alkylating groups.

3. The process of claim 1 wherein the oxygen and nitric oxide used to treat the hydrocarbon substrates are preformed mixtures.

4. The process of claim 1 wherein the oxygen and nitric oxide are contacted with the hydrocarbon substrates as separate gases.

5. A process for preparing nitrooxidation products of hydrocarbon substrates containing from about 7 to 30 carbon atoms, said hydrocarbons being selected from the group consisting of saturated linear aliphatics, saturated cycloaliphatics, aromatics, and alkylated aromatics, comprising the steps of:
    (a) contacting gaseous oxygen and gaseous nitric oxide, in a volume ratio ranging from about 1 to about 40 volumes of oxygen to each volume of nitric oxide, with the hydrocarbon substrates to be nitrooxidized, at a temperature ranging from about 25° C. to about 150° C. until nitrooxidation products are formed, and
    (b) isolating the nitrooxidation products contained therein.

6. The process of claim 5 wherein the total gas flow rate ranges from about 2.5 to 5 volumes per volume of hydrocarbon substrate.

7. The process of claim 5 wherein the gaseous oxygen and nitric oxide are contacted with the substrates as separate gases.

8. The process of claim 5 wherein the gaseous oxygen and nitric oxide are contacted with the substrates are preformed mixtures.

9. The process of claim 5 wherein the substrates are alkylated aromatics containing from about 7 to 30 carbon atoms.

10. The process of claim 5 wherein the substrates are saturated aliphatics.

11. A process for nitrooxidizing hydrocarbon substrates containing about 5 to 30 carbon atoms with gaseous oxygen and nitric oxide so as to favor the production of nitrogen-containing oxidation products at the expense of non-nitrogen containing products, comprising the steps of:
    (a) passing gaseous oxygen and nitric oxide into the substrates to be nitrooxidized, at a temperature ranging from about 25° C. to about 150° C., said gases being in a volume ratio ranging from about 1 to about 40 volumes of oxygen to each volume of nitric oxide, said gases being passed into said hydrocarbon substrates at a flow rate ranging from about 2.5 to 5 volumes of gas per minute per volume of substrate, said substrates containing at least one alkaline inhibitor until nitrogen-containing oxidation products are formed, and
    (b) isolating the products contained therein.

12. The process of claim 11 wherein the alkaline inhibitor is sodium bicarbonate.

13. The process of claim 11 wherein the alkaline inhibitor is sodium fluoride.

14. The process of claim 11 wherein the gaseous oxygen and nitric oxide are passed into the substrates as separate gases.

15. The process of claim 11 wherein the gaseous oxygen and nitric oxide are passed into the substrates as preformed mixtures.

References Cited
UNITED STATES PATENTS

| | | | |
|---|---|---|---|
| 3,133,123 | 5/1964 | Bonfield | 260—644 |
| 3,189,654 | 6/1965 | Arthur | 260—466 X |
| 3,378,596 | 4/1968 | Toops et al. | 260—644 |
| 3,415,856 | 12/1968 | Lachowicz et al. | 260—533 X |
| 3,466,326 | 9/1699 | Lachowicz et al. | 260—466 X |

LELAND A. SEBASTIAN, Primary Examiner

U.S. Cl. X.R.

260—467, 524 N, 586 B, 592, 599, 622 R, 644, 645, 687